(12) United States Patent
Wang et al.

(10) Patent No.: US 11,810,528 B2
(45) Date of Patent: Nov. 7, 2023

(54) DISPLAY ASSEMBLY, DISPLAY DEVICE AND DRIVING METHOD FOR DISPLAY ASSEMBLY EACH COMBINING DATA SIGNALS AS DIMMING SIGNAL

(71) Applicants: Beijing BOE Optoelectronics Technology Co., Ltd., Beijing (CN); BOE Technology Group Co., Ltd., Beijing (CN)

(72) Inventors: Yaoyao Wang, Beijing (CN); Rui Han, Beijing (CN); Jie Yu, Beijing (CN); Xiaoxia Wang, Beijing (CN); Meng Li, Beijing (CN); Shulin Qin, Beijing (CN); Tielei Zhao, Beijing (CN); Chunhua Wang, Beijing (CN); Pengtao Li, Beijing (CN); Tingfeng Huang, Beijing (CN); Xiaoqiao Dong, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/765,203

(22) PCT Filed: Jun. 16, 2021

(86) PCT No.: PCT/CN2021/100345
§ 371 (c)(1),
(2) Date: Mar. 30, 2022

(87) PCT Pub. No.: WO2021/259102
PCT Pub. Date: Dec. 30, 2021

(65) Prior Publication Data
US 2022/0383832 A1    Dec. 1, 2022

(30) Foreign Application Priority Data

Jun. 23, 2020 (CN) .......................... 202010585060.X

(51) Int. Cl.
*G09G 3/36* (2006.01)

(52) U.S. Cl.
CPC ... *G09G 3/3688* (2013.01); *G09G 2320/0626* (2013.01); *G09G 2354/00* (2013.01); *G09G 2360/16* (2013.01)

(58) Field of Classification Search
CPC ......... G09G 3/3688; G09G 2320/0626; G09G 2354/00; G09G 2360/16
See application file for complete search history.

(56) References Cited

U.S. PATENT DOCUMENTS

| 4,547,043 A | 10/1985 | Penz |
| 2010/0007670 A1* | 1/2010 | Song .................... G09G 3/3426 345/545 |

(Continued)

FOREIGN PATENT DOCUMENTS

| CN | 101065705 A | 10/2007 |
| CN | 101295096 A | 10/2008 |

(Continued)

OTHER PUBLICATIONS

Office Action dated Sep. 1, 2021 issued in corresponding in Chinese Application No. 202010585060.X.

*Primary Examiner* — Kwang-Su Yang
(74) *Attorney, Agent, or Firm* — Nath, Goldberg & Meyer; Joshua B. Goldberg

(57) ABSTRACT

A display assembly, a display device and a driving method for the display assembly are provided. The display assembly includes: a dimming array (10) and a pixel array (20) stacked together; wherein the dimming array (10) includes a plurality of dimming units (101) arranged in an array; the pixel array (20) includes a plurality of pixel units (201) arranged in an array; each dimming unit (101) corresponds to at least one pixel unit (201), and different dimming units (101) correspond to different pixel units (201), respectively. The display assembly further includes: a first driver chip (102) configured to drive the dimming array (10). The number of output channels of the first driver chip (102) is equal to the number of columns of dimming units (101) in the dimming array (10), and each output channel of the first driver chip (102) is connected to one column of dimming units (101).

13 Claims, 3 Drawing Sheets

(56) References Cited

U.S. PATENT DOCUMENTS

| | | | | |
|---|---|---|---|---|
| 2015/0154919 A1* | 6/2015 | Ooshima | .............. | G09G 3/3426 345/589 |
| 2018/0231836 A1* | 8/2018 | Suzuki | ................ | G02F 1/13471 |
| 2019/0064559 A1* | 2/2019 | Harada | ................ | G02B 6/0013 |
| 2021/0080767 A1* | 3/2021 | Liao | .................. | G02F 1/133514 |

FOREIGN PATENT DOCUMENTS

| | | | |
|---|---|---|---|
| CN | 102650779 | A | 8/2012 |
| CN | 105551444 | A | 5/2016 |
| CN | 106940491 | A | 7/2017 |
| CN | 107045858 | A | 8/2017 |
| CN | 108761888 | A | 11/2018 |
| CN | 109147699 | A | 1/2019 |
| CN | 10133883 | A | 8/2019 |
| CN | 110361899 | A | 10/2019 |
| CN | 110543052 | A | 12/2019 |
| CN | 210348143 | U | 4/2020 |
| CN | 111613146 | A | 9/2020 |
| JP | 2017-227776 | A | 12/2017 |

* cited by examiner

DISPLAY ASSEMBLY, DISPLAY DEVICE AND DRIVING METHOD FOR DISPLAY ASSEMBLY EACH COMBINING DATA SIGNALS AS DIMMING SIGNAL

CROSS REFERENCE TO RELATED APPLICATIONS

This is a National Phase Application filed under 35 U.S.C. 371 as a national stage of PCT/CN2021/100345, filed Jun. 16, 2021, an application claiming the priority of the Chinese Patent Application No. 202010585060.X filed on Jun. 23, 2020, the content of each of which is incorporated herein by reference in its entirety.

TECHNICAL FIELD

The present disclosure relates to the field of display technology, in particular to a display assembly, a display device and a driving method for the display assembly.

BACKGROUND

Current stacked screen (such as BD cell) display products generally include two layers, which are an upper layer and a lower layer, stacked together. The upper layer is provided with a pixel array, and has a display function. The lower layer is provided with a dimming array and may be driven by a driver chip independently. A light transmittance of each dimming unit in the dimming array is controlled by controlling a rotation angle of liquid crystals in the dimming unit, so that a pixel-level local dimming function is realized, a contrast (or contrast ratio) of a displayed picture on the pixel array is improved, and the display effect is further improved.

SUMMARY

Some embodiments of the present disclosure provide a display assembly, a display device and a driving method for the display assembly.

In a first aspect, the present disclosure provides a display assembly, including: a dimming array and a pixel array stacked together; wherein the dimming array includes a plurality of dimming units arranged in an array; the pixel array includes a plurality of pixel units arranged in an array; each of the plurality of dimming units corresponds to at least one of the plurality of pixel units, and different dimming units correspond to different pixel units, respectively; the display assembly further includes: a first driver chip configured to drive the dimming array; and the number of output channels of the first driver chip is equal to the number of columns of dimming units in the dimming array, and each output channel of the first driver chip is connected to one column of dimming units.

In some embodiments of the present disclosure, the display assembly further includes a second driver chip configured to drive the pixel array, wherein each of the plurality of pixel units includes a plurality of sub-pixels; and the number of output channels of the second driver chip is equal to the number of columns of sub-pixels in the pixel array, and each output channel of the second driver chip is connected to one column of sub-pixels.

In some embodiments of the present disclosure, the first driver chip and the second driver chip are of the same type, and the number of output channels of the first driver chip is smaller than the number of output channels of the second driver chip.

In some embodiments of the present disclosure, each of the plurality of pixel units includes N sub-pixels, where N is a positive integer; a ratio of a resolution of the dimming array to a resolution of the pixel array is 1:n, where n is a positive integer; and the number of output channels of the first driver chip is 1/(N×n) of the number of output channels of the second driver chips.

In some embodiments of the present disclosure, n is 2 or 3, and N is 3 or 4.

In some embodiments of the present disclosure, each of the plurality of pixel units includes a red sub-pixel, a green sub-pixel, and a blue sub-pixel; and the ratio of the resolution of the dimming array to the resolution of the pixel array is 1:2.

In some embodiments of the present disclosure, the display assembly further includes: a controller; and wherein the controller is configured to: transmit a plurality of data signals to the corresponding sub-pixels through the output channels of the second driver chip according to a to-be-displayed picture; convert the plurality of data signals into a plurality of dimming signals corresponding to the number of output channels of the first driver chip according to the ratio of the resolution of the dimming array to the resolution of the pixel array, and transmit the plurality of dimming signals to corresponding dimming units through the output channels of the first driver chip to adjust the light transmittance of the dimming units.

In some embodiments of the present disclosure, the controller is configured to: process the plurality of data signals to extract information therein; combine the data signals of sub-pixels of a same color corresponding to a same column of dimming units, according to the number of input channels of the first driver chip, to form the plurality of dimming sub-signals; and pack three dimming sub-signals corresponding to a same column of dimming units to form the plurality of dimming signals.

In some embodiments of the present disclosure, the controller includes a field programmable gate array.

In some embodiments of the present disclosure, the dimming array further includes a plurality of control lines and a plurality of input lines intersecting with each other, and each of the plurality of dimming units is at a position where one of the plurality of control lines and one of the plurality of input lines intersect with each other; the dimming units in a same row are connected to a same control line; the dimming units in a same column are connected to a same input line; the pixel array further includes a plurality of gate lines and a plurality of data lines intersecting with each other, and each of the plurality of sub-pixels is at a position where one of the plurality of gate lines and one of the plurality of data lines intersect with each other; the sub-pixels in a same row are connected to a same gate line, and the sub-pixels in a same column are connected to a same data line; the output channels of the first driver chip are connected to the plurality of input lines in a one-to-one correspondence; and the output channels of the second driver chip are connected to the plurality of data lines in a one-to-one correspondence.

In some embodiments of the present disclosure, the pixel array further includes: a color filter on a side of the sub-pixels distal to the dimming units.

In a second aspect, the present disclosure provides a display device, which includes the display assembly according to any one of the embodiments of the first aspect, and a touch panel disposed on a light outgoing side of the display assembly.

In some embodiments of the present disclosure, the display device further includes: a backlight assembly on a side of the dimming units distal to the sub-pixels.

In a third disclosure, the present disclosure provides a driving method for a display assembly, the driving method being configured to drive the display assembly according to any one of the embodiments of the first aspect, wherein the driving method for the display assembly includes steps of: transmitting a plurality of data signals to the corresponding sub-pixels through the output channels of the second driver chip according to a to-be-displayed picture; converting the plurality of data signals into a plurality of dimming signals corresponding to the number of output channels of the first driver chip according to the ratio of the resolution of the dimming array to the resolution of the pixel array, and transmitting the plurality of dimming signals to corresponding dimming units through the output channels of the first driver chip to adjust the light transmittance of the dimming units.

In some embodiments of the present disclosure, the step of converting the plurality of data signals into the plurality of dimming signals corresponding to the number of output channels of the first driver chip includes steps of: processing the plurality of data signals to extract information therein; combining the data signals of sub-pixels of a same color corresponding to a same column of dimming units, according to the number of input channels of the first driver chip, to form a plurality of dimming sub-signals; and packing three dimming sub-signals corresponding to a same column of dimming units to form the plurality of dimming signals.

In some embodiments of the present disclosure, the information of the data signals is brightness information.

DETAIL DESCRIPTION OF EMBODIMENTS

Figure 1:
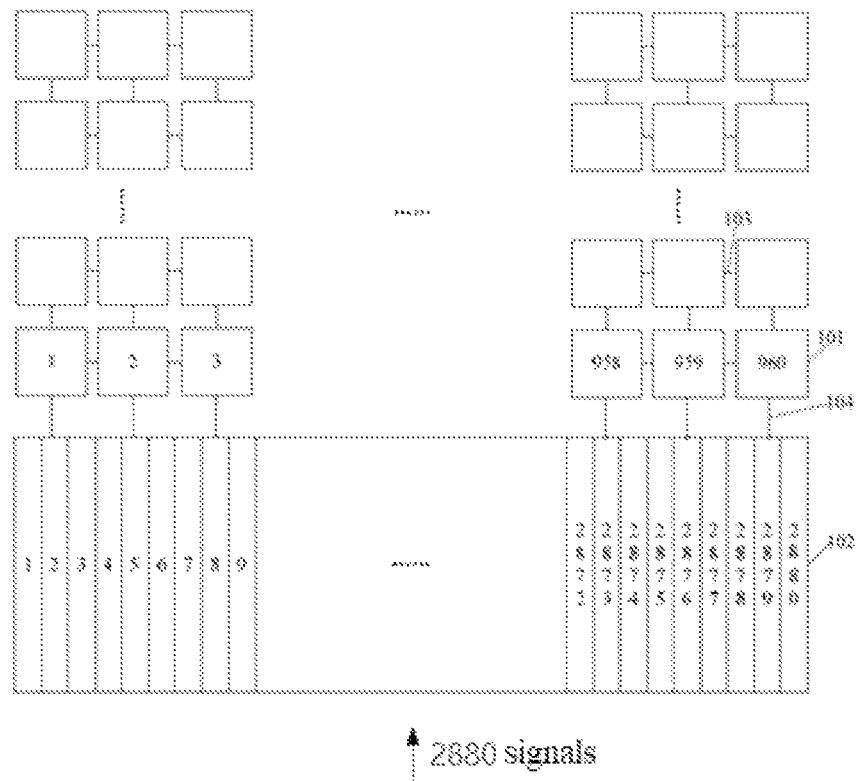
FIG. 1 is a schematic diagram of a structure of a dimming array according to an embodiment of the present disclosure.

In order to enable one of ordinary skill in the art to better understand the technical solutions of the present disclosure, the present disclosure will be described below in further detail with reference to the accompanying drawings and exemplary embodiments.

In the stacked screen display product, the dimming array of the lower layer and the pixel array of the upper layer are driven by identical driver chips, respectively, and the driver chip connected to the dimming array uses only ⅓ of the number of output channels of the driver chip, and the rest ⅔ of the number of the output channels are suspended. However, signals in the suspended output channels are easily radiated outwards, which affects the signal transmission in the normal output channels (i.e., output channels which are not suspended), thereby easily causing the signals to oscillate and thus, affecting the display effect. Further, ⅔ of the number of the output channels are suspended, so that the output channels in the driver chip are wasted, the number of the driver chips is increased, and the use cost is increased. At present, the stacked screen display technology has been applied to large-sized consumer products, and mass production has been achieved. The stacked screen display product generally has a double-layer structure including two layers that are an upper layer provided with a pixel array and a lower layer provided with a dimming array. The two layers are attached to each other, such that the local dimming (i.e., local light dimming) is realized. The pixel array of the upper layer may realize the display function, and corresponds to the dimming array of the lower layer. The dimming array is driven by a first driver chip which also drives the pixel array, so that the light transmittance is controlled by controlling the rotation angle of liquid crystals in the dimming array, thereby realizing the pixel-level local dimming. In order to realize the overall light transmittance after the two layers are attached to each other, a ratio of the resolution of the dimming array of the lower layer to the resolution of the pixel array of the upper layer is generally 1:2 or 1:3, and each dimming unit in the dimming array is not provided with a sub-structure, and thus, is a whole dimming unit, so that an aperture ratio of each dimming unit is increased.

In the embodiments of the present disclosure, as an example, a display assembly has a resolution of 1920RGB× 720. The pixel array may have a conventional RGB pixel structure, and pixel units of the pixel array may be arranged according to 1920RGB×720. A second driver chip for driving the pixel array may be a conventional driver chip, and the specific implementation principle thereof will be described in detail in the following detailed description. As an example, the ratio of the resolution of the dimming array to the resolution of the pixel array is 1:2, according to which the dimming array may be arranged, that is, the dimming units of the dimming array are arranged according to 960Dot×360. The first driver chip for driving the dimming array may be the same as the second driver chip.

FIG. 1 is a schematic diagram of a structure of a dimming array according to an embodiment of the present disclosure. As shown in FIG. 1, the dimming units 101 in the dimming array are arranged in 960 columns. The first driver chip 102 is a conventional driver chip; each pixel unit includes three sub-pixels having colors different from each other (i.e., a red sub-pixel, a green sub-pixel, and a blue sub-pixel), and the corresponding first driver chip 102 has 960×3=2880 output channels. As shown in FIG. 1, the number of output channels of the first driver chip 102 is 2880, the numbering of which is exemplarily labeled in FIG. 1. In this way, ⅔ of the number of the output channels in the first driver chip 102 are suspended, i.e., not connected to the corresponding dimming units 101.

The dimming array shown in FIG. 1 is suitable for a large-sized stacked screen display product. However, the number of the first driver chips 102 is limited by fan-out traces at the bottom. If the number of the first driver chips 102 is small, the fan-out traces are all concentrated near the first driver chips 102, so that a border of the display product is too large, and the problem of weak bonding is likely to occur.

In a vehicle-mounted display product which is mainly a medium-sized or small-sized stacked screen display product, the dimming array shown in FIG. 1 is adopted. The first driver chip 102 in the vehicle-mounted product has a stronger driving capability, signals in the suspended output channels are easily radiated outwards, which affects the signal transmission in the normal output channels, thereby easily causing the signals to oscillate and thus, affecting the display effect.

Therefore, embodiments of the present disclosure provide a display assembly, a display device and a driving method for the display assembly. The display assembly, the display device and the driving method for the display assembly provided in the embodiments of the present disclosure will be described in further detail with reference to the accompanying drawings and exemplary embodiments. The display assembly, the display device and the driving method for the display assembly provided by the embodiments of the present disclosure are suitable for the vehicle-mounted display product which is mainly a medium-sized or small-sized stacked screen display product, and are also suitable for large-sized stacked screen display products.

Embodiment I

Figure 2:
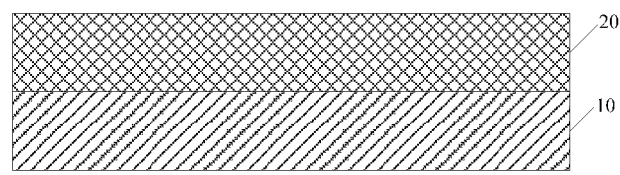
FIG. 2 is a schematic diagram of a structure of a display assembly according to an embodiment of the present disclosure.
Figure 3:
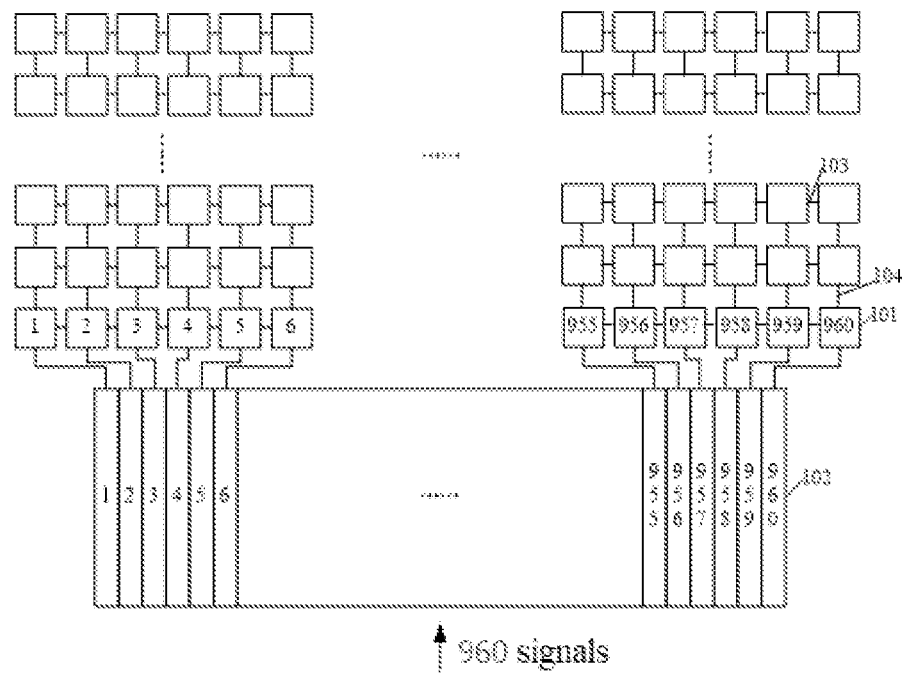
FIG. 3 is a schematic diagram of a structure of a dimming array according to an embodiment of the present disclosure.
Figure 4:
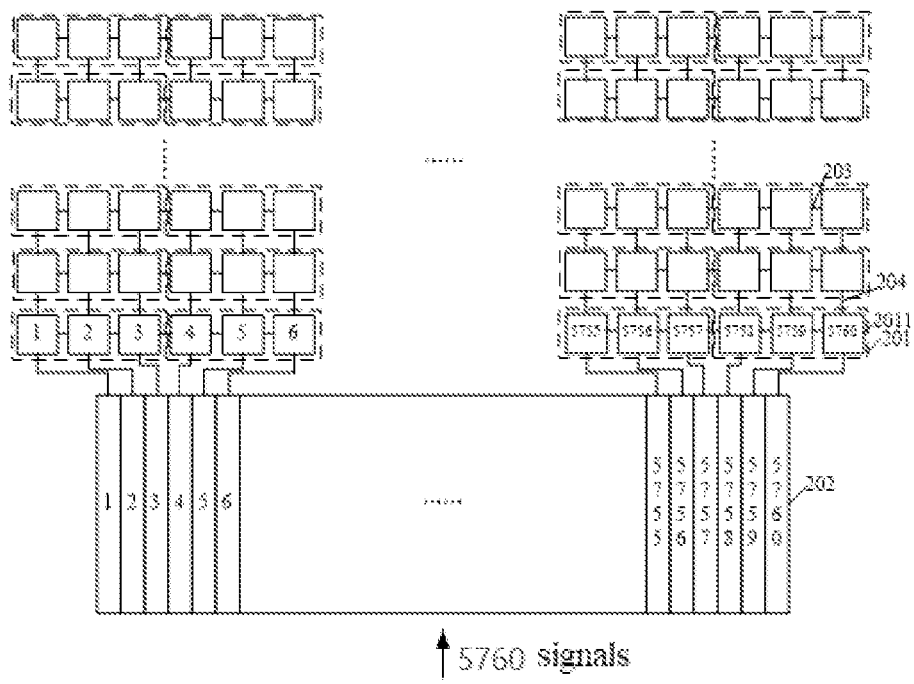
FIG. 4 is a schematic diagram of a structure of a pixel array according to an embodiment of the present disclosure.

FIG. 2 is a schematic diagram of a structure of a display assembly according to an embodiment of the present disclosure. As shown in FIG. 2, the display assembly includes: a dimming array 10 and a pixel array 20 stacked together. FIG. 3 is a schematic diagram of a structure of a dimming array according to an embodiment of the present disclosure. As shown in FIG. 3, the dimming array 10 includes a plurality of dimming units 101 arranged in an array. FIG. 4 is a schematic diagram of a structure of a pixel array according to an embodiment of the present disclosure. As shown in FIG. 4, the pixel array 20 includes a plurality of pixel units 201 arranged in an array, and each pixel unit includes a plurality of sub-pixels 2011. As shown in FIGS. 3 and 4, each dimming unit 101 corresponds to at least one pixel unit 201, and different dimming units 101 correspond to different pixel units 201, respectively. The display assembly further includes: a first driver chip 102 configured to drive the dimming array 10 and a second driver chip 202 configured to drive the pixel array 20; the number of output channels of the first driver chip 102 is equal to the number of columns of the dimming units 101 in the dimming array 10, and each output channel of the first driver chip 102 is connected to one corresponding column of the dimming units 101; the number of output channels of the second driver chip 202 is equal to the number of columns of the sub-pixels 2011 in the pixel array 20, and each output channel of the second driver chip 202 is connected to one corresponding column of the sub-pixels 2011.

As shown in FIG. 3, the dimming units 101 in the dimming array 10 are arranged in 960 columns. As shown in FIG. 3, the first driver chip 102 has 960 output channels, the numbering of which is exemplarily labeled in FIG. 3. As shown in FIG. 4, the pixel units 201 in the pixel array 20 are arranged in 1920 columns. As shown in FIG. 4, the sub-pixels 2011 in the pixel array 20 are arranged in 5760 columns. As shown in FIG. 4, the second driver chip 202 has 5760 output channels, the numbering of which is exemplarily labeled in FIG. 4.

In the display assembly provided by the embodiment of the present disclosure, dimming units 101 in the dimming array 10 may be driven by dimming signals provided by the first driver chip 102. Specifically, the rotation angle of the liquid crystals in each dimming unit 101 is adjusted by adjusting a magnitude of a dimming signal voltage, so that the light transmittance of each dimming unit 101 may be adjusted. Sub-pixels 2011 in the pixel array 20 may be driven by data signals provided by the second driver chip 202, so as to implement a normal display function.

Each dimming unit 101 corresponds to at least one pixel unit 201, and different dimming units 101 correspond to different pixel units 201, respectively; and the brightness of light passing through the dimming unit 101 corresponding to the sub-pixels 2011 in the at least one pixel unit 201 is adjusted by controlling the light transmittance of the dimming unit 101, so that the brightness of the corresponding sub-pixel 2011 which needs to present a dark picture is lower, and the brightness of the corresponding sub-pixel 2011 which needs to present a bright picture is higher, thereby improving the contrast of sub-pixels 2011 in the pixel array 20, and further improving the display effect.

Further, unlike the dimming array shown in FIG. 1, in the display assembly provided in the present embodiment, the number of output channels of the first driver chip 102 configured to drive the dimming array 10 is equal to the number of columns of the dimming units 101 in the dimming array 10, and each output channel is connected to one column of the dimming units 101. A plurality of dimming signals, the number of which is equal to the number of the output channels of the first driver chip 102, may be input to the dimming units 101 in the corresponding columns according to the number of the output channels of the first driver chip 102. In this way, output channels in the first driver chip 102 are not necessarily suspended. Therefore, the case where signals in the suspended output channels are radiated outwards to influence the signal transmission in the normal output channel is avoided, so that the signals in the normal output channels may be prevented from oscillating, and the display effect may be improved. In addition, output channels in the first driver chip 102 are not necessarily suspended, the output channels of the first driver chip 102 may be fully utilized, so that the number of the first driver chips 102 may be reduced, and the use cost may be reduced.

In some embodiments, the types of the first driver chip 102 and the second driver chip 202 are the same, but the number of output channels of the first driver chip 102 is smaller than the number of output channels of the second driver chip 202.

It should be noted that in practical applications, the resolution of the dimming array 10 may be set to be lower in order to ensure the light transmittance of the dimming array 10 in a lower layer. For example, the ratio of the resolution of the dimming array 10 to the resolution of the pixel array 20 is 1:2, according to which the dimming array 10 may be arranged. The dimming array 10 and the pixel array 20 may be respectively driven by driver chips of a same type. For example, both the first driver chip 102 and the second driver chip 202 may be conventional driver chips. The resolutions of the dimming array 10 and the pixel array 20 are different from each other, so that the number of output channels of the first driver chip 102 and the number of output channels of the second driver chip 202 are different from each other. Specifically, the number of output channels of the first driver chip 102 corresponding to the dimming array 10 with a lower resolution is smaller than the number of output channels of the second driver chip 202 corresponding to the pixel array 20 with a higher resolution. It may be understood that the first driver chip 102 and the second driver chip 202 with different numbers of output channels may be reasonably selected according to the resolutions of the dimming array 10 and the pixel array 20.

Figure 6:
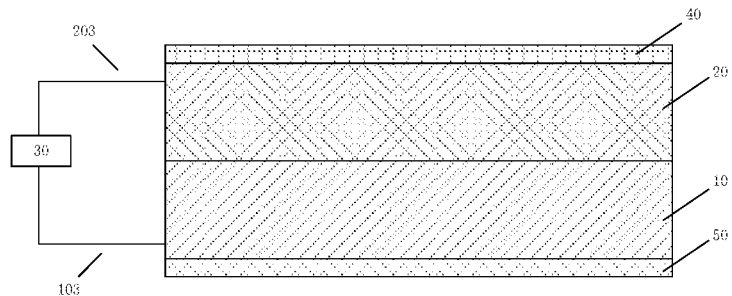
FIG. 6 is a schematic diagram of a structure of a display device according to an embodiment of the present disclosure.

In some embodiments, as shown in FIG. 6, the display assembly further includes: a controller 30. The controller 30 is configured to transmit a plurality of data signals to the corresponding sub-pixels 2011 through the output channels of the second driver chip 202 according to a to-be-displayed picture; and convert the plurality of data signals into a plurality of dimming signals corresponding to the number of output channels of the first driver chip 102, according to the ratio of the resolution of the dimming array to the resolution of the pixel array, and transmit the plurality of dimming signals to the corresponding dimming units 101 through the output channels of the first driver chip 102 to adjust the light transmittance of the dimming units 101.

It should be noted that by taking the display assembly with a resolution of 1920RGB×720 is taken as an example, pixel units 201 in the pixel array 20 may be arranged according to 1920RGB×720. As an example, the ratio of the resolution of the dimming array 10 to the resolution of the pixel array 20 is 1:2, according to which the dimming array 10 may be arranged, that is, the dimming units 101 of the dimming array 10 are arranged according to 960Dot×360. Each column of the dimming units 101 may correspond to two columns of the pixel units 201. The RGB may represent the sub-pixels 2011 in each pixel unit 201, respectively, i.e., R may represent a red sub-pixel, G may represent a green sub-pixel, B may represent a blue sub-pixel, and Dot may represent one dimming unit 101. Each dimming unit 101 is unitary unit (i.e., has a one-piece structure). Accordingly, the first driver chip 102 has 960 output channels, and the second driver chip 202 has 1920×3=5760 output channels.

In the embodiment of the present disclosure, RGB pixels are taken as an example, that is, each pixel unit includes a red sub-pixel, a green sub-pixel, and a blue sub-pixel. However, the present disclosure is not limited thereto. In other embodiments of the present disclosure, each pixel unit may also include other numbers of sub-pixels of different colors, where the number of sub-pixels in each pixel unit is N, where N is a positive integer. For example, each pixel unit is an RGBW pixel, that is, each pixel unit includes a red sub-pixel, a green sub-pixel, a blue sub-pixel, and a white sub-pixel.

In the embodiment of the present disclosure, as an example, the ratio of the resolution of the dimming array 10 to the resolution of the pixel array 20 is 1:2, according to which the dimming array 10 may be arranged (i.e., the dimming array 10 may be arranged so that the ratio of the resolution of the dimming array 10 to the resolution of the pixel array 20 is 1:2). However, the present disclosure is not limited thereto. In other embodiments of the present disclosure, the ratio of the resolution of the dimming array 10 to the resolution of the pixel array 20 is 1:n, where n is a positive integer.

In the embodiment of the present disclosure, the number of sub-pixels in each pixel unit is N and the ratio of the resolution of the dimming array 10 to the resolution of the pixel array 20 is 1:n, so that the ratio of the number of columns of the dimming array 10 to the number of columns of the pixel array 20 is 1/(N×n). That is, the number of output channels of the first driver chip 102 is 1/(N×n) of the number of output channels of the second driver chip 202.

For example, the number of sub-pixels in each pixel unit is 3 and the ratio of the resolution of the dimming array to the resolution of the pixel array is 1:2, so that the number of output channels of the first driver chip 102 is 1/6 of the number of output channels of the second driver chip 202. For example, the number of sub-pixels in each pixel unit is 3 and the ratio of the resolution of the dimming array to the resolution of the pixel array is 1:3, so that the number of output channels of the first driver chip 102 is 1/9 of the number of output channels of the second driver chip 202. For example, the number of sub-pixels in each pixel unit is 4 and the ratio of the resolution of the dimming array to the resolution of the pixel array is 1:2, so that the number of output channels of the first driver chip 102 is 1/8 of the number of output channels of the second driver chip 202. For example, the number of sub-pixels in each pixel unit is 4 and the ratio of the resolution of the dimming array to the resolution of the pixel array is 1:3, so that the number of output channels of the first driver chip 102 is 1/12 of the number of output channels of the second driver chip 202.

In the embodiment of the present disclosure, for 1920RGB×720, 1920RGB indicates that each of the number of columns of red sub-pixels, the number of columns of green sub-pixels, and the number of columns of blue sub-pixels is 1920; 720 indicates that the number of rows of pixel units is 720. In embodiments of the present disclosure, Dot represents only one item, not multiple separate portions, as compared to the RGB. In the embodiment of the present disclosure, for 960Dot×360, 960Dot indicates that the number of columns of the dimming units 101 is 960; 360 indicates that the number of rows of the dimming units 101 is 360.

In the embodiment of the present disclosure, in the case where each pixel unit includes a red sub-pixel, a green sub-pixel, a blue sub-pixel, and a white sub-pixel, with 1920RGBW×720, it indicates that each of the number of columns of the red sub-pixels, the number of columns of the green sub-pixels, the number of columns of the blue sub-pixels, and the number of columns of the white sub-pixels is 1920.

According to a picture to be displayed (i.e., to-be-displayed picture), 5760 data signals may be input to sub-pixels 2011 through corresponding output channels of the second driver chip 202, respectively, so that the pixel array 20 achieves a normal display function. In order to improve the contrast of the to-be-displayed picture, according to the ratio of the resolution of the dimming array to the resolution of the pixel array, 960 dimming signals may be input to dimming units 101 through output channels of the first driver chip 102, respectively, so that the light transmittance of the dimming units 101 in the dimming array 10 may be adjusted by controlling the rotation angles of the liquid crystals of the dimming units 101, so as to adjust the brightness of light passing through the dimming units 101, so that the brightness of the corresponding sub-pixel 2011 which needs to present a dark picture is lower, and the brightness of the corresponding sub-pixel 2011 which needs to present a bright picture is higher, thereby improving the contrast of picture displayed on the pixel array 20, and further improving the display effect. In this way, each output channel of the first driver chip 102 is connected to the corresponding dimming unit 101. Therefore, the case where signals in the suspended output channels are radiated outwards to influence the signal transmission in the normal output channel may be avoided, so that the signals may be prevented from oscillating, and the display effect may be improved.

In some embodiments, the controller 30 is specifically configured to process the plurality of data signals to extract information (e.g., brightness) therein; combine data signals of sub-pixels of a same color (e.g., any one of red sub-pixels, green sub-pixels, and blue sub-pixels) corresponding to a same column of dimming units 101, according to the number of input channels of the first driver chip 102, to form a plurality of dimming sub-signals; and pack every three dimming sub-signals to form a plurality of dimming signals. Specifically, the ratio of the resolution of the dimming array 10 to the resolution of the pixel array 20 is 1:2 and each pixel unit 201 includes a red sub-pixel, a green sub-pixel, and a blue sub-pixel, so that the dimming signal for dimming units 101 in each column in the dimming array 10 is a signal obtained by performing the following processing on the data signals in the corresponding two columns of pixel units 201 (including the corresponding two columns of red sub-pixels, the corresponding two columns of green sub-pixels, and the corresponding two columns of blue sub-pixels) corresponding to the column of dimming units 101: information (e.g., brightness) of the data signals in the two columns of pixel units 201 is extracted through an algorithm embedded in the controller 30. Specifically, information of the data signals in the corresponding two columns of red sub-pixels is extracted and combined into a dimming sub-signal; information of the data signals in the corresponding two columns of green sub-pixels is extracted and combined into a dimming sub-signal; and information of the data signals in the corresponding two columns of blue sub-pixels is extracted and combined into a dimming sub-signal. Finally, the three dimming sub-signals are packed to form the dimming signal for each column of the dimming units 101. The data signals of other columns are processed in the same way, so that the plurality of dimming signals are formed.

In other embodiments of the present disclosure, as an example, the ratio of the resolution of the dimming array 10 to the resolution of the pixel array 20 is 1:2 and each pixel unit 201 includes a red sub-pixel, a green sub-pixel, and a blue sub-pixel. The ratio of the resolution of the dimming array 10 to the resolution of the pixel array 20 is 1:2, so that one dimming array 10 corresponds to four pixel arrays 20. Four brightness values of sub-pixels of a same color (e.g., any one of red sub-pixels, green sub-pixels, and blue sub-pixels) in the four pixel arrays 20 are extracted and combined into one brightness value by the controller 30 through an algorithm, thereby forming dimming sub-signals. Since each pixel unit 201 includes a red sub-pixel, a green sub-pixel, and a blue sub-pixel, the three dimming sub-signals corresponding to the dimming array 10 are packed to form the dimming signals for the dimming array 10.

It should be noted that the second driver chip 202 and the first driver chip 102 may be driver chips of a same type, but the number of output channels in the first driver chip 102 is only ⅙ of the number of output channels of the second driver chip 202. Therefore, the output channels of the first driver chip 102 may be reduced, so as to reduce the number of the first driver chips 102 and reduce the use cost. In practical applications, 5760 data signals may be processed to extract information (e.g., brightness) therein; combine a plurality of data signals of sub-pixels of a same color (e.g., any one of red sub-pixels, green sub-pixels, and blue sub-pixels) corresponding to the same column of dimming units 101, according to the number of input channels of the first driver chip 102, to form 2880 dimming sub-signals; pack every three dimming sub-signals to form 960 dimming signals; and transmit the 960 dimming signals to the corresponding dimming units 101 through the output channels of the first driver chip 102. With the dimming signals, the light transmittance of the liquid crystals may be adjusted by controlling the rotation angles of the liquid crystals of the dimming units 101 in the dimming array 10, so as to adjust the brightness of the light passing through the dimming units 101, so that the brightness of the corresponding sub-pixel 2011 which needs to present a dark picture is lower, and the brightness of the corresponding sub-pixel 2011 which needs to present a bright picture is higher, thereby improving the contrast of the displayed picture on the pixel array 20, and further improving the display effect.

In some embodiments, a plurality of data signals different from each other may be converted by the controller 30 into a plurality of data signals identical to each other, and the controller includes a field programmable gate array.

It should be noted that the controller 30 may be implemented by a Field Programmable Gate Array (FPGA). The FPGA may process (e.g., convert, combine, pack, etc.) the plurality of data signals the number of which is equal to the number of output channels of the second driver chip 202, to form the plurality of dimming signals the number of which is equal to the number of output channels of the first driver chip 102, and transmit the dimming signals to the corresponding dimming units 101, so as to implement the pixel-level local dimming function.

In some embodiments, as shown in FIGS. 3 and 4, the dimming array 10 further includes a plurality of control lines 103 and a plurality of input lines 104 intersecting with each other, and each dimming unit 101 is located in a region defined by the intersection of a control line 103 and an input line 104 corresponding to the dimming unit 101. In some embodiments, as shown in FIGS. 3 and 4, the pixel array 20 further includes a plurality of gate lines 203 and a plurality of data lines 204 intersecting with each other, and each sub-pixel 2011 is located at a region defined by the intersection of a gate line 203 and a data line 204 corresponding to the sub-pixel 2011. The dimming units 101 in a same row are connected to a same control line 103; the dimming units 101 in a same column are connected to a same input line 104. The sub-pixels 2011 in a same row are connected to a same gate line 203, and the sub-pixels 2011 in a same column are connected to a same data line 204. The output channels of the first driver chip 102 are connected to the input lines 104 in a one-to-one correspondence; the output channels of the second driver chip 202 are connected to the data lines 204 in a one-to-one correspondence.

In the embodiment of the present disclosure, the dimming array 10 further includes the plurality of control lines 103 and the plurality of input lines 104 intersecting with each other, and each of the plurality of dimming units 101 is located at a position where one of the plurality of control lines 103 and one of the plurality of input lines 104 intersect with each other; the dimming units 101 in a same row are connected to a same control line 103; the dimming units 101 in a same column are connected to a same input line 104. Further, in the embodiment of the present disclosure, the pixel array 20 further includes the plurality of gate lines 203 and the plurality of data lines 204 intersecting with each other, and each of the plurality of sub-pixels 2011 is located at a position where one of the plurality of gate lines 203 and one of the plurality of data lines 204 intersect with each other; the sub-pixels 2011 in a same row are connected to a same gate line, and the sub-pixels 2011 in a same column are connected to a same data line. Further, in the embodiment of the present disclosure, the output channels of the first driver chip 102 are connected to the input lines 104 in a one-to-one correspondence; the output channels of the second driver chip 202 are connected to the data lines 204 in a one-to-one correspondence.

It should be noted that a control line 103 may be connected to the dimming units 101 in a same row, and an input line 104 may be connected to the dimming units 101 in a same column. As shown in FIG. 6, the controller 30 is connected to the control lines 103 to input control signals into the control lines 103 to turn on each row of the dimming units 101 row by row. The first driver chip 102 may input a dimming signal to the dimming units 101 in a column through the corresponding input line 104, so as to implement precise control of each dimming unit 101 in the dimming array 10, and implement the pixel-level local dimming function. A gate line 203 may be connected to the sub-pixels 2011 in a same row, and a data line 204 may be connected to the sub-pixels 2011 in a same column. As shown in FIG. 6, the controller 30 is connected to the gate lines 203 to input scan signals to the gate lines 203 to turn on each row of sub-pixels 2011 row by row. The second driver chip 202 may input a data signal to the sub-pixels 2011 in a column through the corresponding data line 204, so as to implement the display function of the pixel array.

Each dimming unit 101 corresponds to the sub-pixels 2011 in at least one pixel unit 201, and different dimming units 101 correspond to the sub-pixels 2011 in different pixel units 201; and the brightness of light passing through the dimming unit 101 corresponding to the sub-pixels 2011 in the at least one pixel unit 201 is adjusted by controlling the light transmittance of the dimming unit 101, so that the brightness of the corresponding sub-pixel 2011 which needs to present a dark picture is lower, and the brightness of the corresponding sub-pixel 2011 which needs to present a bright picture is higher, thereby implementing the pixel-level local dimming, improving the contrast of the sub-pixels 2011 in the pixel array 20, and further improving the display effect of the pixel array 20.

In some embodiments, as shown in FIG. 6, the pixel array 20 further includes: a color filter 40 located on a side of the sub-pixels 2011 distal to the dimming units 101.

It should be noted that the color filter 40 may filter light transmitted through the dimming units 101 in the dimming array 10 and the sub-pixels in the pixel array 20, and may output red light, green light, and blue light. Then, the light of such three colors is mixed according to a certain proportion, thereby realizing a color display.

Embodiment II

FIG. 6 is a schematic diagram of a structure of a display device according to an embodiment of the present disclosure. The embodiment of the present disclosure provides a display device, which includes the display assembly provided by any one of the above embodiments. In addition, the display device may further include a conventional touch panel provided on a light outgoing side of the display assembly, so that the display device has both a display function and a touch function. Specifically, the display device may be a terminal device such as a mobile phone, a notebook computer, a tablet computer, a smart television, a vehicle-mounted navigator, or the like. The implementation principle for the display device is similar to that of the display assembly provided in any one of the above embodiments, and is not described herein again.

In some embodiments, as shown in FIG. 6, the display device further includes: a backlight assembly 50 on a side of the dimming units 101 distal to the sub-pixels 2011.

It should be noted that the backlight assembly may provide light for the dimming units 101 in the dimming array 10 and the sub-pixels 2011 in the pixel array 20, so that light may pass through the sub-pixels 2011 in the pixel array 20 and the color filter, thereby achieving a normal display function. The light transmittance of light provided by the backlight assembly to a pixel unit 201 may be controlled by controlling the rotation angle of the liquid crystals in the dimming unit 101 corresponding to the sub-pixel 2011, so that the contrast of a displayed picture on the pixel array 20 is improved, and the display effect may be improved.

Embodiment III

Figure 5:
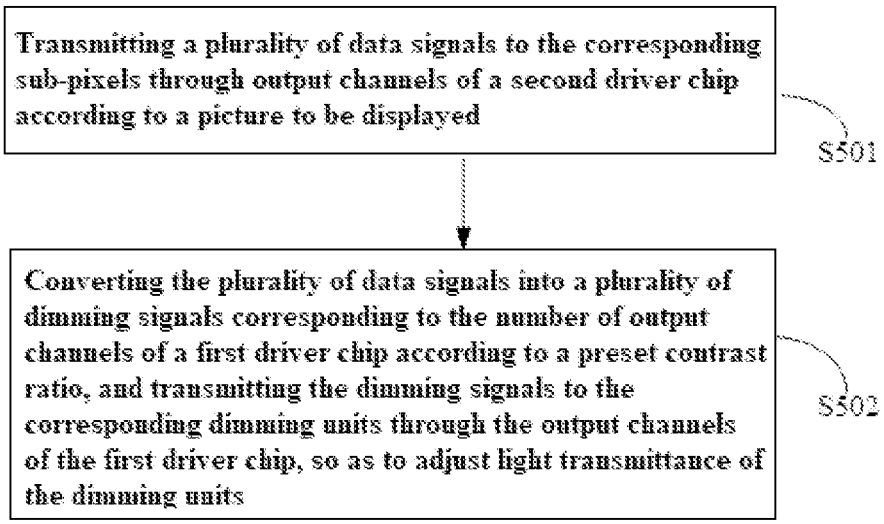
FIG. 5 is a schematic flowchart illustrating a driving method for a display assembly according to an embodiment of the present disclosure.

FIG. 5 is a schematic flowchart illustrating a driving method for a display assembly according to an embodiment of the present disclosure. The driving method for the display assembly may be configured to drive the display assembly provided by any one of the above embodiments. As shown in FIG. 5, the driving method for the display assembly includes the following steps S501 and S502.

Step S501 includes transmitting the plurality of data signals to the sub-pixels through the output channels of the second driver chip according to a picture to be displayed.

Step S502 includes converting the plurality of data signals into the plurality of dimming signals corresponding to the number of output channels of the first driver chip according to the ratio of the resolution of the dimming array to the resolution of the pixel array, and transmitting the plurality of dimming signals to the corresponding dimming units through the output channels of the first driver chip, so as to adjust the light transmittance of the dimming units.

It should be noted that, the plurality of data signals are input to the sub-pixels through the output channels of the second driver chip, and the number of the plurality of data signals corresponds to the number of the output channels of the second driver chip, so that a normal display function may be realized.

According to the resolution ratio of the dimming array to the pixel array, the plurality of data signals may be converted into dimming signals. The dimming signals have a same type as that of the above data signals, except that the number of the plurality of dimming signals is less than the number of the plurality of data signals, the number of the plurality of dimming signals is equal to the number of the output channels of the first driver chip, and each dimming signal only includes part of information (e.g., brightness) in each data signal. Therefore, each output channel in the first driver chip may be fully utilized, the dimming signals are transmitted to the dimming units through the output channels of the first driver chip, so that the light transmittance of light provided by the backlight assembly to a pixel unit may be controlled by controlling the rotation angle of the liquid crystals in the dimming unit corresponding to the sub-pixel of the pixel unit, so that the contrast of a displayed picture on the pixel array is improved, and the display effect may be improved.

In some embodiments, in step S502, converting the plurality of data signals into the plurality of dimming signals corresponding to the number of output channels of the first driver chip includes steps of: processing the plurality of data signals to extract information (e.g., brightness) therein; combining the plurality of data signals of sub-pixels of a same color (e.g., any one of red sub-pixels, green sub-pixels, and blue sub-pixels) corresponding to a same column of dimming units 101, according to the number of input channels of the first driver chip 102, to form a plurality of dimming sub-signals; and packing every three dimming sub-signals to form a plurality of dimming signals. Specifically, the ratio of the resolution of the dimming array 10 to the resolution of the pixel array 20 is 1:2 and each pixel unit 201 includes a red sub-pixel, a green sub-pixel, and a blue sub-pixel, so that the dimming signal in dimming units 101 in each column in the dimming array 10 is a signal obtained by performing the following processing on the data signals in the corresponding two columns of pixel units 201 (including the corresponding two columns of red sub-pixels, the corresponding two columns of green sub-pixels, and the corresponding two columns of blue sub-pixels) corresponding to the column of dimming units 101: information (e.g., brightness) of the data signals in the two columns of pixel units 201 is extracted through an algorithm embedded in the controller 30. Specifically, information of the data signals in the corresponding two columns of red sub-pixels is extracted and combined into a dimming sub-signal; information of the data signals in the corresponding two columns of green sub-pixels is extracted and combined into a dimming sub-signal; and information of the data signals in the corresponding two columns of blue sub-pixels is extracted and combined into a dimming sub-signal. Finally, the three dimming sub-signals are packed to form the dimming signal in each column of the dimming units 101. The data signals of other columns are processed in the same way, so that the plurality of dimming signals is formed.

In other embodiments of the present disclosure, as an example, the ratio of the resolution of the dimming array 10 to the resolution of the pixel array 20 is 1:2 and each pixel unit 201 includes a red sub-pixel, a green sub-pixel, and a blue sub-pixel. The ratio of the resolution of the dimming array 10 to the resolution of the pixel array 20 is 1:2, so that one dimming array 10 corresponds to four pixel arrays 20. Four brightness values of sub-pixels of a same color (e.g., any one of red sub-pixels, green sub-pixels, and blue sub-pixels) in the four pixel arrays 20 are extracted and combined into one brightness value by the controller 30 through an algorithm, thereby forming dimming sub-signals. Since each pixel unit 201 includes a red sub-pixel, a green sub-pixel, and a blue sub-pixel, the three dimming sub-signals corresponding to the dimming array 10 are packed to form the dimming signals for the dimming array 10.

It should be noted that the second driver chip 202 and the first driver chip 102 may be driver chips of a same type, but the number of output channels in the first driver chip 102 is only ⅙ of the number of output channels of the second driver chip 202. Therefore, the output channels of the first driver chip 102 may be reduced, so as to reduce the number of the first driver chips 102 and reduce the use cost. In practical applications, 5760 data signals may be processed to extract information (e.g., brightness) therein; combine a plurality of data signals of sub-pixels of a same color (e.g., any one of red sub-pixels, green sub-pixels, and blue sub-pixels) corresponding to a same column of dimming units 101, according to the number of input channels of the first driver chip 102, to form 2880 dimming sub-signals; pack every three dimming sub-signals to form 960 dimming signals; and transmit the 960 dimming signals to the corresponding dimming units 101 through the output channels of the first driver chip 102. With the dimming signals, the light transmittance of the liquid crystals may be adjusted by controlling the rotation angles of the liquid crystals of the dimming units in the dimming array, so as to adjust the brightness of the light passing through the dimming units, so that the brightness of the corresponding sub-pixel which needs to present a dark picture is lower, and the brightness of the corresponding sub-pixel which needs to present a bright picture is higher, thereby improving the contrast of the displayed picture on the pixel array, and further improving the display effect.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. A display assembly, comprising:
    a dimming array and a pixel array which are stacked together,
    wherein: the dimming array comprises a plurality of dimming units arranged in an array, the pixel array comprises a plurality of pixel units arranged in an array, each of the plurality of dimming units corresponds to at least one of the plurality of pixel units, and different dimming units correspond to different pixel units, respectively;
    the display assembly further comprises: a first driver chip configured to drive the dimming array;
    a number of output channels of the first driver chip is equal to a number of columns of dimming units in the dimming array, and each output channel of the first driver chip is connected to one column of dimming units; and
    the display assembly further comprises a second driver chip configured to drive the pixel array, wherein: each of the plurality of pixel units comprises a plurality of sub-pixels; and a number of output channels of the second driver chip is equal to a number of columns of sub-pixels in the pixel array, and each output channel of the second driver chip is connected to one column of sub-pixels,
    wherein: the first driver chip and the second driver chip are of a same type; and the number of output channels of the first driver chip is smaller than the number of output channels of the second driver chip,
    wherein the display assembly further comprises a controller, and the controller is configured to: transmit a plurality of data signals to corresponding sub-pixels through the output channels of the second driver chip according to a to-be-displayed picture; convert the plurality of data signals into a plurality of dimming signals corresponding to the number of output channels of the first driver chip according to the ratio of the resolution of the dimming array to the resolution of the pixel array; and transmit the plurality of dimming signals to corresponding dimming units through the output channels of the first driver chip to adjust light transmittance of the dimming units, and
    wherein the controller is configured to: process the plurality of data signals to extract information therein; combine the data signals of sub-pixels of a same color corresponding to a same column of dimming units, according to the number of input channels of the first driver chip, to form a plurality of dimming sub-signals; and pack three dimming sub-signals corresponding to a same column of dimming units to form the plurality of dimming signals.

2. The display assembly of claim 1, wherein:
    each of the plurality of pixel units comprises N sub-pixels, where N is a positive integer;
    a ratio of a resolution of the dimming array to a resolution of the pixel array is 1:n, where n is a positive integer; and
    the number of output channels of the first driver chip is $1/(N \times n)$ of the number of output channels of the second driver chip.

3. The display assembly of claim 2, wherein:
n is 2 or 3; and
N is 3 or 4.

4. The display assembly of claim 3, wherein:
each of the plurality of pixel units comprises a red sub-pixel, a green sub-pixel, and a blue sub-pixel; and
the ratio of the resolution of the dimming array to the resolution of the pixel array is 1:2.

5. The display assembly of claim 2, wherein:
the dimming array further comprises a plurality of control lines and a plurality of input lines intersecting with each other, and each of the plurality of dimming units is at a position where one of the plurality of control lines and one of the plurality of input lines intersect with each other; the dimming units in a same row are connected to a same control line; and the dimming units in a same column are connected to a same input line;
the pixel array further comprises a plurality of gate lines and a plurality of data lines intersecting with each other, and each of the plurality of sub-pixels is at a position where one of the plurality of gate lines and one of the plurality of data lines intersect with each other; the sub-pixels in a same row are connected to a same gate line, and the sub-pixels in a same column are connected to a same data line;
the output channels of the first driver chip are connected to the plurality of input lines in a one-to-one correspondence; and
the output channels of the second driver chip are connected to the plurality of data lines in a one-to-one correspondence.

6. The display assembly of claim 1, wherein
the controller comprises a field programmable gate array.

7. The display assembly of claim 1, wherein:
the dimming array further comprises a plurality of control lines and a plurality of input lines intersecting with each other, and each of the plurality of dimming units is at a position where one of the plurality of control lines and one of the plurality of input lines intersect with each other; the dimming units in a same row are connected to a same control line; and the dimming units in a same column are connected to a same input line;
the pixel array further comprises a plurality of gate lines and a plurality of data lines intersecting with each other, and each of the plurality of sub-pixels is at a position where one of the plurality of gate lines and one of the plurality of data lines intersect with each other; the sub-pixels in a same row are connected to a same gate line, and the sub-pixels in a same column are connected to a same data line;
the output channels of the first driver chip are connected to the plurality of input lines in a one-to-one correspondence; and
the output channels of the second driver chip are connected to the plurality of data lines in a one-to-one correspondence.

8. The display assembly of claim 1, wherein
the pixel array further comprises: a color filter on a side of the sub-pixels distal to the dimming units.

9. A display device, comprising the display assembly of claim 1, and a touch panel on a light outgoing side of the display assembly.

10. The display device of claim 9, further comprising:
a backlight assembly on a side of the dimming units distal to sub-pixels of the plurality of pixel units.

11. A driving method configured to drive the display assembly of claim 1, the driving method comprising:
transmitting a plurality of data signals to corresponding sub-pixels of the plurality of pixel units through output channels of a second driver chip according to a to-be-displayed picture;
converting the plurality of data signals into a plurality of dimming signals corresponding to the number of output channels of the first driver chip according to a ratio of a resolution of the dimming array to a resolution of the pixel array, and
transmitting the plurality of dimming signals to corresponding dimming units through the output channels of the first driver chip to adjust light transmittance of the dimming units.

12. The driving method of claim 11, wherein:
the converting the plurality of data signals into the plurality of dimming signals corresponding to the number of output channels of the first driver chip comprises:
processing the plurality of data signals to extract information therein;
combining the data signals of sub-pixels of a same color corresponding to a same column of dimming units, according to the number of input channels of the first driver chip, to form a plurality of dimming sub-signals; and
packing three dimming sub-signals corresponding to a same column of dimming units to form the plurality of dimming signals.

13. The driving method of claim 12, wherein
the information of the data signals is brightness information.

* * * * *